US011843532B2

(12) United States Patent
Lee et al.

(10) Patent No.: US 11,843,532 B2
(45) Date of Patent: *Dec. 12, 2023

(54) APPLICATION PEERING

(71) Applicant: Comcast Cable Communications, LLC, Philadelphia, PA (US)

(72) Inventors: Yiu Leung Lee, Philadelphia, PA (US); Franklyn Athias, Cherry Hill, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 5 days.

This patent is subject to a terminal disclaimer.

(21) Appl. No.: 16/860,700

(22) Filed: Apr. 28, 2020

(65) Prior Publication Data

US 2020/0328958 A1    Oct. 15, 2020

Related U.S. Application Data

(63) Continuation of application No. 16/228,115, filed on Dec. 20, 2018, now Pat. No. 10,673,724, which is a continuation of application No. 15/176,675, filed on Jun. 8, 2016, now Pat. No. 10,200,265.

(60) Provisional application No. 62/174,237, filed on Jun. 11, 2015.

(51) Int. Cl.
| | |
|---|---|
| *H04L 43/0876* | (2022.01) |
| *H04L 67/141* | (2022.01) |
| *H04L 67/306* | (2022.01) |
| *H04L 43/08* | (2022.01) |

(52) U.S. Cl.
CPC ........ *H04L 43/0876* (2013.01); *H04L 67/141* (2013.01); *H04L 67/306* (2013.01); *H04L 43/08* (2013.01)

(58) Field of Classification Search
CPC . H04L 63/0209; H04L 63/0218; H04L 63/10; H04L 63/18; H04L 63/20; H04L 63/0807; H04L 63/0823; H04L 63/0853; H04L 63/0876; H04L 41/0896; H04L 63/083; H04L 63/0815
See application file for complete search history.

(56) References Cited

U.S. PATENT DOCUMENTS

| | | | |
|---|---|---|---|
| 8,745,718 B1 | 6/2014 | Dufel et al. | |
| 2009/0307744 A1* | 12/2009 | Nanda ................. | H04L 63/0807 726/1 |
| 2011/0289314 A1* | 11/2011 | Whitcomb .......... | H04L 63/0884 713/155 |
| 2014/0208095 A1 | 7/2014 | Stuntebeck et al. | |
| 2017/0034175 A1* | 2/2017 | Leung ................. | H04L 63/0876 |

(Continued)

*Primary Examiner* — Farzana B Huq
(74) *Attorney, Agent, or Firm* — Banner & Witcoff, Ltd.

(57) ABSTRACT

Systems and methods are described herein for managing peering relationships and applying peering policy between service providers and content distribution networks. Aspects discussed herein relate to establishing secure peering connections between service providers to exchange application and/or network information. In some embodiments, an application peering manager may apply peering policy based on token information or other suitable information configured to uniquely identify an application and/or subscriber. In other embodiments, policy enforcement points or other elements residing within a network may be configured to accept and/or apply peering policy to application sessions.

21 Claims, 5 Drawing Sheets

(56) References Cited

U.S. PATENT DOCUMENTS

2017/0093815 A1* 3/2017 Chen ................... H04L 9/0841
2019/0075462 A1* 3/2019 Wang ................... H04L 63/08

* cited by examiner

APPLICATION PEERING

CROSS REFERENCE TO RELATED APPLICATIONS

This application is a continuation of and claims the benefit of priority from U.S. patent application Ser. No. 16/228,115 filed Dec. 20, 2018, now allowed, which is a continuation of and claims the benefit of priority from U.S. patent application Ser. No. 15/176,675 filed Jun. 8, 2016 and issued as U.S. Pat. No. 10,200,265, which claims the benefit of priority from U.S. Provisional Application No. 62/174,237, entitled "Application Peering" and filed Jun. 11, 2015. The contents of the above listed applications are expressly incorporated herein by reference in their entirety for any and all non-limiting purposes.

BACKGROUND

Current methods of monitoring data traffic and applying policy between communication networks can be complicated and lead to inefficient results. With the proliferation of content made available for consumption to subscribers by service providers, it has become exceedingly difficult to efficiently balance load on individual network elements and to reduce the waste of network resources caused by subscriber-initiated attacks. The flexibility and precision offered by the increased exchange of network and subscriber usage information can be beneficial, as such, there remains an ever-present need for simplified ways to improve the arrangement of traffic exchange between service providers.

SUMMARY

The following summary is for illustrative purposes only, and is not intended to limit or constrain the detailed description. The following summary merely presents various described aspects in a simplified form as a prelude to the more detailed description provided below.

For content service providers (CSPs) to deliver a service to a subscriber in a different network, this typically involves two peering relationships. The first peering relationship may be a last mile relationship between a subscriber and a network service provider (NSP). The second peering relationship may comprise a series of interconnected peering connections between the NSP and CSP. Such an arrangement of traffic exchange between service providers requires a level of trust between the NSP and its respective subscribers, as well as between the NSP and the peering CSP to provide content services to subscribers on the network. Accordingly, when a CSP offers an application to a subscriber (e.g., end user), such as a content streaming service, the application (and corresponding application data packets) may cross a system of network elements operated by the NSP before reaching the end user. Although the NSP serves as an interface between the CSP and the end user (e.g., subscriber), often the NSP manages these two network relationships independently.

In instances when an application session is not stable, a CSP may be forced to estimate the source of such instability by collecting information from an application session based primarily on collected subscriber and application information. For example, an application session may become unstable when a network subscriber attempts to temporarily or permanently interrupt or suspend services provided by the CSP by launching a denial of service (DoS) attack on the CSP's network. However, in many instances, the CSP may not retrieve network information from the NSP when attempting to resolve instability in an application session. For example, in the instance of a DoS attack on the CSP via an established application session with a subscriber in the NSP's network, the NSP may not detect an attempted attack and/or that an attack is occurring (or has occurred) until after being notified by a CSP that has already been affected by the attack. Accordingly, by peering at the application layer and by exchanging peering and network information, the CSP and NSP may work together cooperatively to proactively mitigate instability in application sessions, or to prevent a network attack before it has reached the CSP.

Aspects of the disclosure relate to various systems and techniques that provide more convenient, functional, and efficient systems and methods for service providers to manage peering relationships, particularly in instances in which network instability is caused by an atypical consumption of network resources by one or more network subscribers or groups of subscribers. Aspects discussed herein may accomplish this by providing enhanced communication between service providers to exchange network, application, and/or peering information without the need for delayed, manual notifications. In addition, certain aspects of the disclosure may provide particular advantages where a CSP desires to apply (and/or adjust) policy to a network subscriber. The NSP may serve as a go-between for the CSP and the subscriber, such that the NSP may apply policy requested by the CSP to resolve network issues caused by and/or adversely affecting the subscriber.

Some aspects discussed herein may provide the exchange of network, application and/or peering information between service providers. In some embodiments, a CSP may utilize an application peering manager to establish and authenticate a peering session with a NSP. The NSP and CSP may utilize application peering managers, respectively, to establish a secured policy communication channel to exchange network and subscriber information in real-time. The secured policy communication channel may also be utilized by the CSP to request the application of specific peering policy. In some embodiments, an application peering manager of the NSP may establish a control communication channel with one or more policy enforcement points (PEPs) within the NSP's network. The application peering manager may be utilized by the NSP to apply peering policy and provide instructions to network PEPs.

In some instances, a CSP may want to apply a specific peering policy to address network issues (e.g., excessive latency, DoS attack, etc.) caused by the subscriber. For example, the CSP may detect that a particular subscriber in the NSP's network is encountering an excessive latency issue during an established application session. The CSP may utilize an application program interface (API) to pass subscriber information over the secure policy communication channel to the NSP. The subscriber information may include source IP information, port information, and/or other information configured to uniquely identify a particular subscriber.

In some embodiments, the CSP may configure an application to insert an application token (or other identifier) into each data packet sent during an application session. The application token may be configured to uniquely identify the application and the subscriber participating in the application session. In some aspects of the present disclosure, an application peering manager in the CSP's network may send a policy request to an application peering manager in the NSP's network. The policy request may include token information and a peering policy to be applied to data packets associated with the token information included in the policy request. The application peering manager in the NSP's network may respond to the policy request from the CSP by instructing one or more network elements (e.g., PEPs) to apply peering policy to particular data packets sent over the network. For example, the NSP may redirect, quarantine, and/or drop data packets containing the application token associated with a particular subscriber and/or application as identified by the token information contained in the policy request. As another example, the NSP may transmit a message or notification to a subscriber identified within a policy request issued by the CSP.

In some instances, the CSP may request network topology information and/or peering information from the NSP relating to a particular subscriber. The CSP may utilize this information when determining whether and/or where to reroute the application data packets for the subscriber. Additionally or alternatively, the CSP may utilize network topology and/or peering information provided by the NSP to determine an optimal data-traffic balance within the network. For example, the CSP may identify that a first PEP in a first geographic region that is experiencing a network issue (e.g., DoS attack) or is approaching/exceeding an optimal level of workload. Based at least in part on information received from the NSP, the CSP may determine a second PEP in a second geographic area to handle workload (or data traffic) currently being routed to the first PEP. The system of distributing network, application and/or peering information as described herein may be particularly advantageous where content distribution networks are geographically dispersed. Furthermore, this may provide for simplified identification and resolution of network congestion and other issues as application peering managers associated with the NSP and CSP, respectively, exchange vital network, application and peering information to effectively balance data traffic across multiple content distribution networks.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

One or more embodiments of the present disclosure provide mechanisms that operate in a content routing device in order to make routing and peering decisions concerning the distribution of client requests between service providers and/or content distribution networks that operate in a peering relationship with each other and to confirm that a service provider and/or content distribution network is abiding by a peering policy. According to some aspects discussed herein, a policy enforcement device may establish a communication connection with a peer tunnel concentrator and/or other network element residing in a service provider's network. In some embodiments, the policy enforcement device (or an application manger integrated therein) may monitor network data traffic to determine whether an application session has been established or initiated by a subscriber utilizing the network. The policy enforcement device may be configured to monitor various types of computing devices including devices capable of establishing a network communication connection, such as a desktop computer, a laptop computer, a thermostat, a set-top device, and the like.

Other aspects described herein may enable the policy enforcement device to accept and/or authenticate peering policy requests sent from content service providers. The peering policy request may include token information and/or other suitable information configured to identify a particular subscriber (or groups of subscribers) and an application (or application session) to which the peering policy should be applied. The policy enforcement device may be further configured to inspect a data packet generated during an application session to determine whether peering policy should be applied to the data packet. In some embodiments, the policy enforcement device may compare token information retrieved from a peering policy request with an application token contained within the inspected data packet.

As noted above, certain embodiments are discussed herein that relate to exchanging peering and network information between service providers. Before discussing these concepts in greater detail, however, several examples of computing devices and system architectures that may be used in implementing and/or otherwise providing various aspects of the disclosure will first be discussed with respect to FIGS. 1 and 2.

Figure 1:
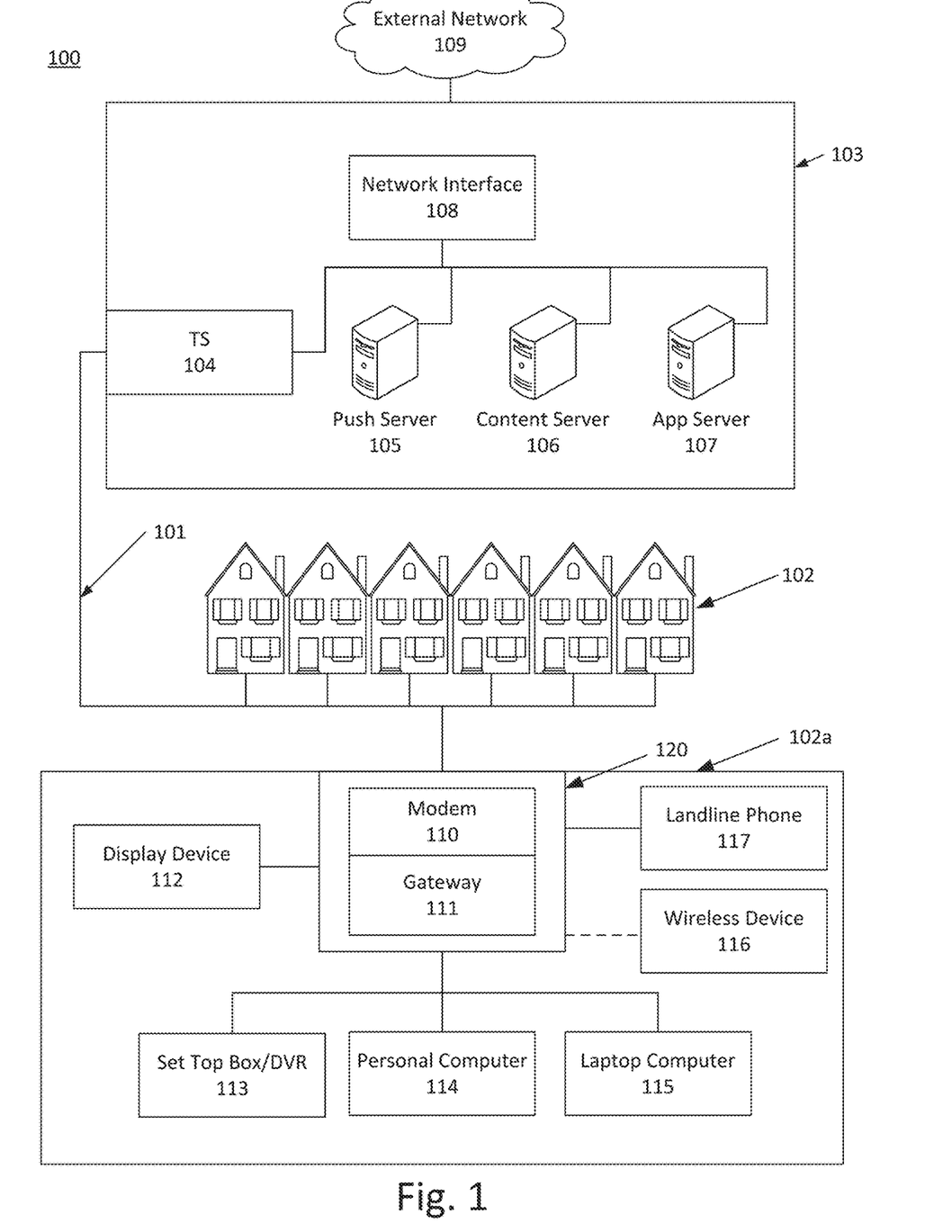
FIG. 1 depicts an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, user dwellings, etc.) to a local office or headend 103. The local office 103 may transmit downstream information signals onto the links 101, and one or more premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. In some aspects of the disclosure, application server 107 may be responsible for monitoring user viewing habits and collecting that information for use in selecting advertisements. In other embodiments, application server 107 may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may be a set-top box (STB), digital video recorder (DVR), computer server, or any other desired computing device. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
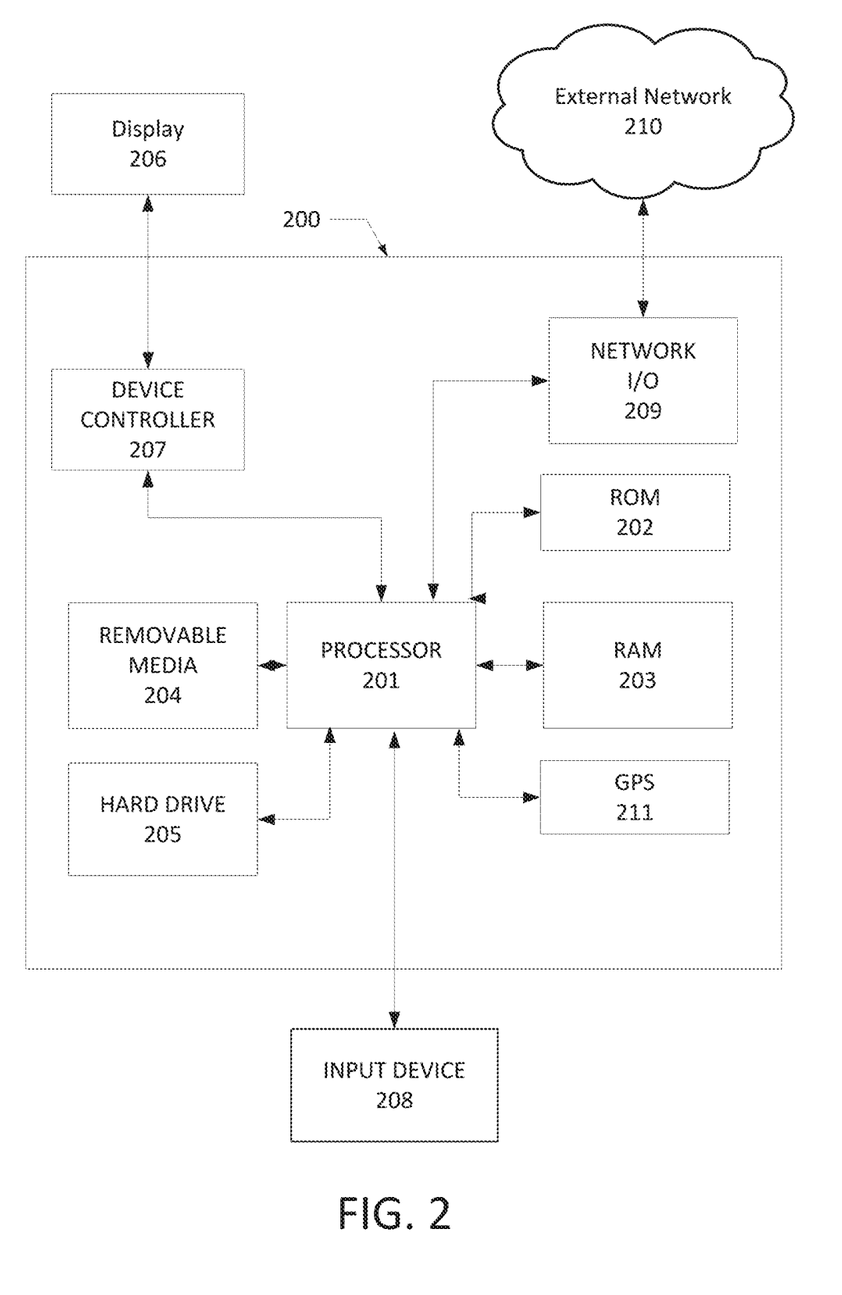
FIG. 2 depicts an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3A:
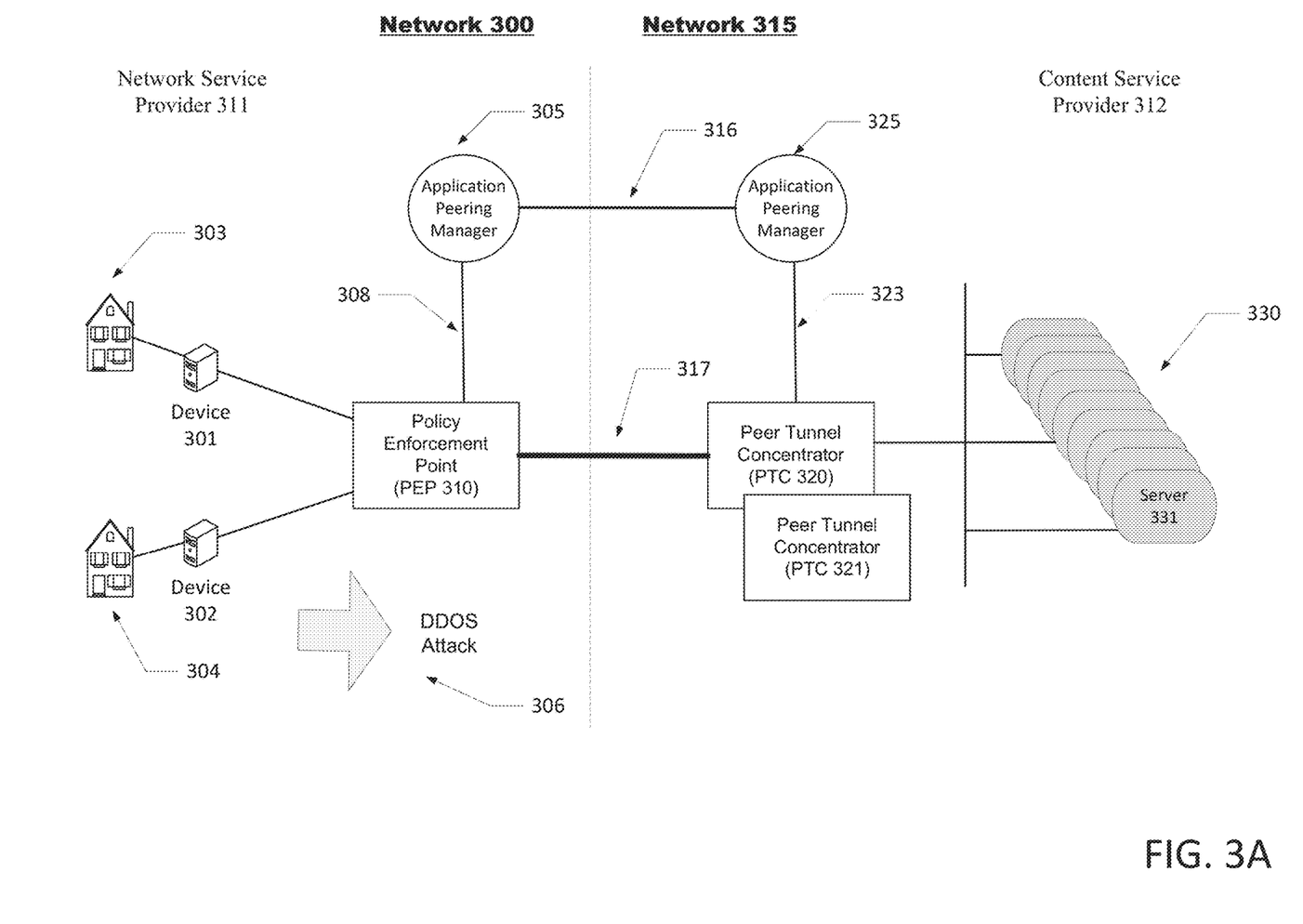
FIG. 3A depicts an illustrative communication network on which various features described herein may be used.

Having discussed several examples of the computing system architecture that may be used in providing and/or implementing various aspects of the disclosure, a number of embodiments will now be discussed in greater detail. FIG. 3A illustrates an example communication network on which many of the various features described herein may be implemented. The depicted networks (e.g., networks 300, 315) may be any type of information distribution network. As illustrated in FIG. 3A, network 300 may comprise a networked environment supporting connections to one or more remote computer devices, such as client devices 301 and 302, which are utilizing the network provided by NSP 311. Client devices 301 and 302 may be personal computers, mobile devices, laptop computers, and/or tablets that include many or all of the elements described above with respect to generic computing device 200 (FIG. 2). It will be appreciated that the network connections shown are illustrative and other means of establishing a communications link between computing devices may be used. Client devices 301 and 302 may also be mobile terminals (e.g., mobile phones, smartphones, personal digital assistants (PDAs), notebooks, etc.) including various other components, such as a battery, speaker, and antennas (not shown). Additionally or alternatively, client devices 301 and 302 may be any device capable of and/or configured to establish a network connection, such as a network thermostat, network security system, and the like. As illustrated in FIG. 3A, a client device (e.g., device 301) may be located at premises (e.g., premises 303) of a user or subscriber utilizing network 300.

A client device may establish a communication channel with a policy enforcement point, such as PEP 310 residing in network 300, to transmit data across the network. The client device may be operatively connected to the ("PEP") in a variety of manners without departing from the scope of the present disclosure, such as by a communication link (e.g., link 101) discussed above in reference to FIG. 1. PEP 310 may comprise a network element configured to accept and apply peering policy to data packets transmitted during an application session. In some aspects of the present disclosure, PEP 310 may comprise a router or any other suitable networking device configured to forward data packets between computer networks.

In some instances, application peering may require NSP 311 and CSP 312 to form a secure and trusted peering session between their respective networks (i.e., networks 300, 315), and to share various types of information, such as application session information, network information, client/subscriber information, etc. As an example, the CSP may share source Internet Protocol (IP) address information and/or source port information for a client device residing in network 300 that is participating in an application session with the CSP. As another example, the CSP may share source Internet Protocol (IP) address information for a network device (or element) intended to receive data packets generated during the application session. In some embodiments, the CSP may share such information with the NSP by means of an application program interface (API) and/or any other suitable protocols established by the service providers. As yet another example, NSP 311 may share with CSP 312 current and/or historical network information (and/or performance metrics) for a particular application session, such as data packet rate, bandwidth, and/or latency information. In other aspects of the present disclosure, the PEP 310 may establish a communication channel with an application peering manager ("APM") residing in network 300, such as APM 305, by means of a control communication channel as depicted by element 308 in FIG. 3A. In some embodiments, APM 305 may be located at a data center and/or executed by a computing device residing in network 300. In other embodiments, APM may be integrated within and/or executed by a network element residing in network 300, such as PEP 310. In still other embodiments, the APM 305 may be run in a cloud computing environment, and may be scaled based on the size of the network with which it resides. An APM (e.g., APM 305) may be configured to authenticate peering sessions established between NSP 311 and CSP 312. In other aspects of the present disclosure, the APM 305 may be configured to accept and inspect policy requests transmitted from a CSP, and may be further configured to apply peering policy in accordance with a received policy request.

As depicted in FIG. 3A, an APM residing in network 300 (e.g., APM 305) may establish a secure policy communication channel 316 with an APM residing in network 315 (e.g., APM 325). Network 315 may comprise a networked environment supporting connections to one or more remote computer devices, such as application servers 330, utilized by CSP 312. In some aspects of the disclosure, a control communication channel (e.g., control communication channel 23) may be established between a computing device (e.g., peer tunnel concentrator 320) and APM 325 residing in network 315. In some embodiments, APM 325 may be integrated within and/or executed by a network element residing in network 315.

In some aspects of the present disclosure, a computing device (e.g., PTC 320) may be operatively in communication with one or more application servers (e.g., servers 330) residing in network 315. In some embodiments, an application server residing in network 315 (e.g., application server 331) may include Session Initiation Protocol (SIP) applications and non-SIP applications. Application server 331 may be configured to host and/or execute applications or services (e.g., an application session) that a subscriber may desire to use. Various applications may be offered by a content service provider with departing from the scope of the present disclosure, such as video-telephony, streaming content, video-gaming content, and the like. In other aspects of the present disclosure, application server 331 may include a media server (not shown) for transmitting various audio, video, and other data.

In some aspects of the present disclosure, a network element (e.g., PEP 310) residing in the NSP's network may establish a communication channel with a computing device residing in the CSP's network (e.g., PTC 320, 321). In some embodiments, the PEP 310 may directly peer with PTC 320 such that the communication channel between the two network elements comprises direct IP traffic. In other embodiments, a PEP (e.g., PEP 310) residing in network 300 may not directly peer with PTC 320 (or another network element residing in network 315), but rather, a workflow communication connection or tunnel (e.g., connection 317) may be established between networks 300 and 315 to connect PEP 310 and PTC 320 (or another suitable network element). In such an embodiment, one or more other network elements (e.g., routers, servers, etc.) may exist within the workflow communication connection between PEP 310 and PTC 320; however, from the perspective of a PTC residing in network 315 (e.g., PTC 320), the communication connection may be abstracted such that the PTC functions and/or operates as though a direct communication channel has been established with PEP 310. Various types of virtual tunnel and/or communication connection protocols may be utilized without departing from the scope of the present disclosure, such as a virtual private network (VPN) tunnel, a generic routing encapsulation (GRE) tunnel, an IP-over-SSH (Secure Shell) tunnel, and the like.

Figure 3B:
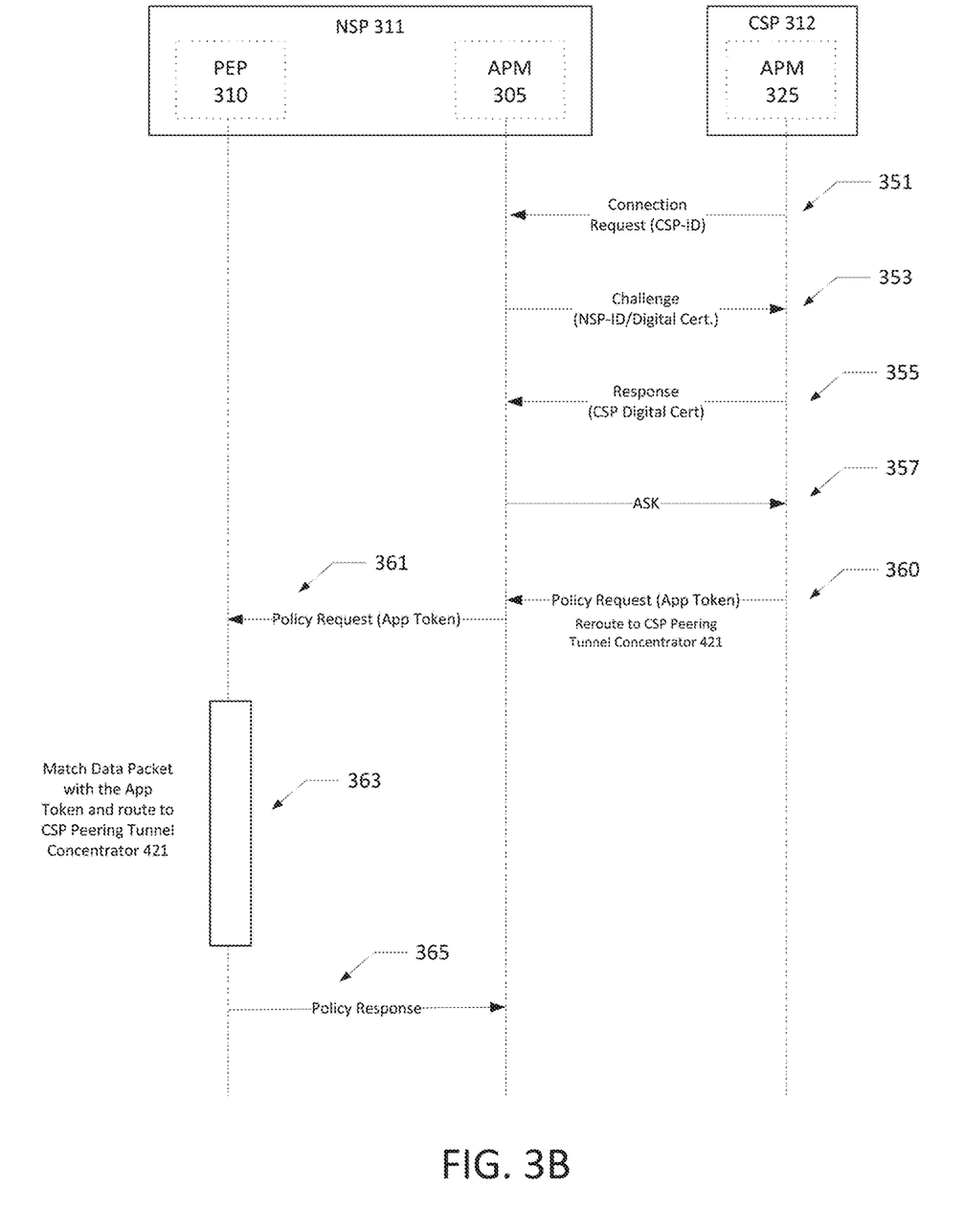
FIG. 3B depicts a process flow diagram in accordance with one or more illustrative aspects discussed herein.
Figure 4:
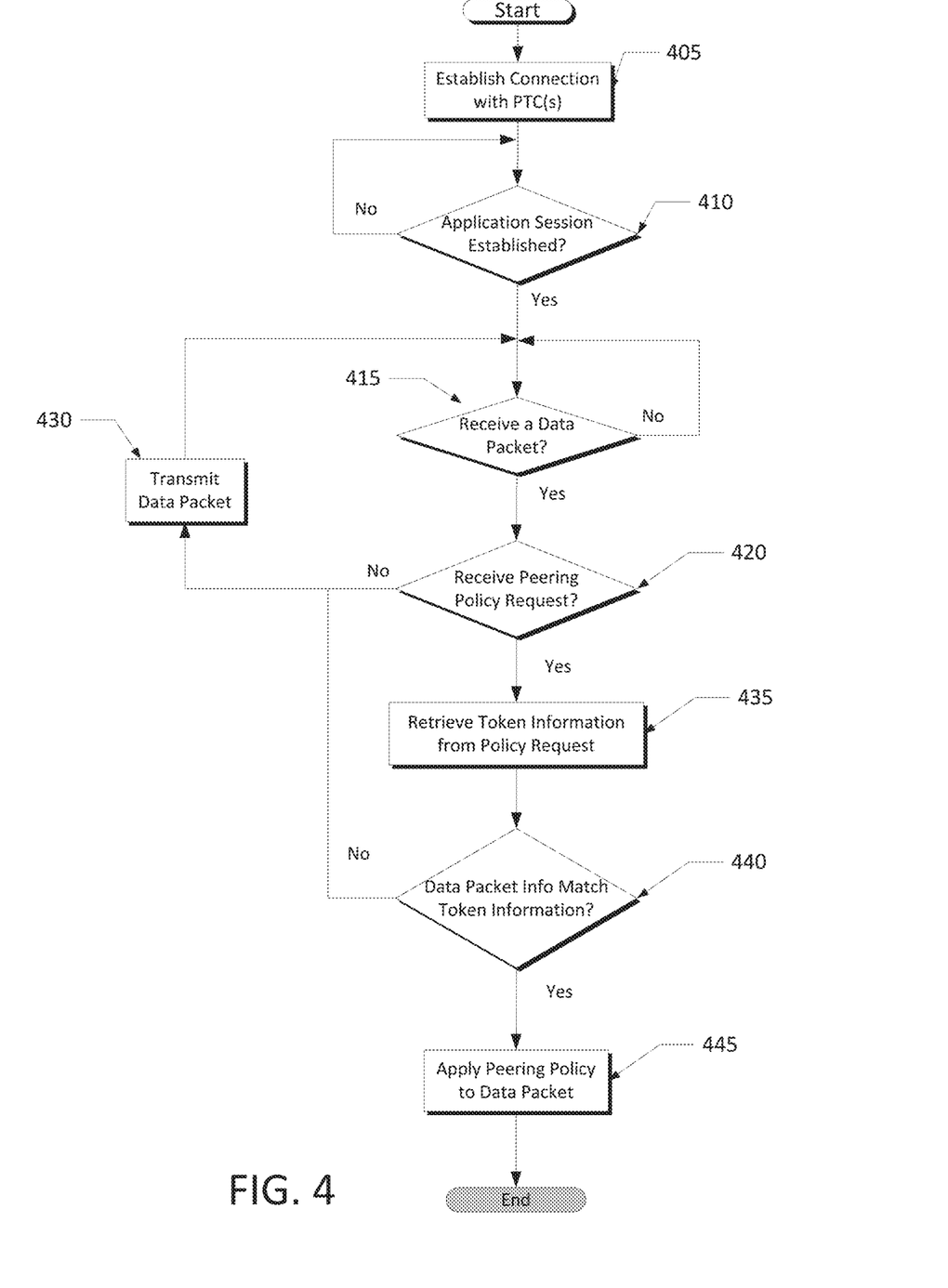
FIG. 4 depicts a flowchart that illustrates a method of application peering in accordance with one or more illustrative aspects discussed herein.

Having discussed an architecture that may be used to perform application peering as shown in FIG. 3A, discussion will now turn to a method of managing peering relationships and applying peering policy, as illustrated in FIGS. 3B and 4.

As one specific example of a scenario in which one or more aspects illustrated in FIG. 3B may be practiced, client device 302 may be a computer device operated by a second user residing in premises 304 (FIG. 3A). The CSP 312 may configure an application to insert an identifier in each data packet generated during an application session. The application token (and/or other identifier) may be configured to uniquely identify the subscriber and/or application participating in the application session. In the instance, that the CSP 312 detects a network issue, such as the second user launching a distributed denial-of-service attack (e.g., DoS attack 306), the CSP 312 may send NSP 311 a peering policy request that includes token information (or other information) identifying the subscriber, the client device (e.g., client device 302), and/or the application associated with the detected network issue.

The NSP 311 may utilize information contained within the policy request to apply policy within network 300 in order to resolve network issues detected by CSP 312. The NSP 311 may apply peering policy to data packets containing an application token corresponding to the token information included within the policy request. For example, the NSP 311 may drop and/or reroute data packets associated with the information contained in the policy request. In some aspects of the present disclosure, the NSP 311 may transmit a message or notification to a subscriber in network 300 indicating that unusual data-traffic and/or network activity is originating from an application session and/or client device. Additionally or alternatively, the NSP 311 may recommend to the subscriber one or more corrective actions to resolve the detected network interruption or issue. For example, in the instance that an unwanted or unintended network attack is originating from a device in the subscriber's premises, the NSP 311 may recommend to the subscriber a particular application or service (e.g., malware software) to resolve the network issue and/or to prevent future issues from occurring. A process flow supporting one or more of these features is described in detail below in regard to FIG. 3B.

FIG. 3B illustrates a process flow of a method for managing application peering and applying peering policy, according to some aspects discussed herein. As discussed above, the NSP 311 may utilize a policy enforcement point (e.g., PEP 310) residing within network 300 to accept and apply peering policy to manage the use of network resources by its subscribers that may be participating in one or more applications sessions provided by CSP 312. Although only one PEP is illustrated in FIG. 3B as residing in network 300, multiple PEPs may be utilized the NSP 311 to facilitate the application of peering policy. NSP 311 may also utilize APM 305 to establish a peering session and/or a communication channel with an application peering manager residing in the content service provider's network (e.g., APM 325), authenticate the established peering session, and to facilitate the application of peering policy. Additionally, as illustrated in FIG. 3B, CSP 312 may also utilize APM 325 to establish peering sessions and communication channels with APM 305.

As depicted in FIG. 3B, the APM 325 may attempt to communicate with the APM 305 to establish a communication channel (e.g., secure policy communication channel 316) between CSP 312 and NSP 311. As discussed above, various types of information may be exchanged between CSP 312 and NSP 311 over secure policy communication channel 316, such as network information, peering policy information, subscriber information, application information, etc. Various types of authentication/authorization protocols may be utilized to establish the communication channel between the NSP 311 and the CSP 312. In some aspects of the present disclosure, authentication may include a CSP's request to a NSP for its identity verification, and authorization may include the NSP's confirmation on the authentication. Authentication and authorization may be handled on a request-by-request basis with a challenge-response mechanism between the content service provider and the network service provider to provide increased security/encryption.

In step 351, APM 325 may send a connection request over a network in an attempt to establish a peering session with NSP 311. In some aspects of the present disclosure, the connection request may be transmitted on a wireless network (or local area network) in which the APM 325 is a member (e.g., network 315). In some embodiments, the connection request may include authentication information and/or a set of access credentials identifying the APM 325, CSP 312, or a subscriber of CSP 312. For example, the connection request may contain a user name, password, and/or secure key associated with the application peering system. As another example, APM 325 may transmit data, such as a content service provider ID ("CSP-ID") or other credentials that uniquely identifies the application peering manager and/or content service provider requesting to establish a connection with APM 305. The connection request may be configured such that an application peering manager residing in network 300 (e.g., APM 305) and/or having remote access capability may recognize the connection request and respond as appropriate. In some aspects of the present disclosure, the APM 325 may send the connection request over the network without knowing the identity of any available application peering managers residing in network 300. As a result, APM 325 need not be pre-configured with knowledge of APM 305 when sending the connection request. Instead, in some embodiments, APM 325 may dynamically discover an application peering manager residing in network 300 (e.g., APM 305) by sending the connection request seeking to establish a communication channel with the NSP 311.

At step 353, APM 305 may respond to the connection request sent from APM 325 by transmitting an authentication challenge. The challenge may include a network service provider ID ("NSP-ID") or other credentials that uniquely identifies the application peering manager (and/or network service provider) responding to the connection request sent during step 351. In some embodiments, APM 305 may also respond to the connection request by sending a digital certificate (e.g., public key certificate). In some embodiments, during step 353, APM 325 may inspect and authenticate the credentials (e.g., NSP-ID) and/or digital certificate sent by APM 305 in response to the receiving the connection request.

At step 355, APM 325 may respond to the authentication challenge sent during step 353 by transmitting a digital certificate. In other embodiments, APM 305 may authenticate the digital certificate or other credentials transmitted from the content service provider during step 355. In embodiments where APM 305 cannot properly authenticate a connection request from a content service provider, the APM 305 may disregard (or deny) the connection request. In some of these embodiments, the APM 305 may transmit a notification to APM 325 (and/or the CSP 312) indicating that the connection request has been denied. At step 357, the APM 305 may transmit a message to APM 325 indicating that the connection request has been accepted. In some aspects of the present disclosure, during step 357, the APM 305 may transfer security and/or encryption protocol information to APM 325. For example, APM 305 may transfer to APM 325 encryption information identifying a particular encryption protocol (e.g., hash filter/algorithm, IP filter, etc.) to be utilized by CSP 312 when encrypting and/or protecting the application token inserted into data packets. Accordingly, when inspecting data packets sent over network 300, the NSP 311 will be aware of the appropriate encryption protocol and/or security measure needed to access encrypted information within a data packet relating to the application token. By encrypting the application token inserted into the data packet during an application session, the CSP 312 provides an additional layer of security to prevent would be attackers from corrupting, accessing, or modifying the application token (or information associated therewith) in order to bypass the established security and/or encryption measures.

In other embodiments, the message transmitted to the application peering manager may indicate that the digital certificate (or other credentials) transmitted during step 355 has been authenticated. CSP 312 may monitor data traffic over network 315 to detect a variety of different network issues, such as network congestion, excessive latency, DoS or other network attacks, unusual levels of network resource consumption, and the like. After a network issue has been detected, the CSP 312 may identify one or more client devices and/or groups of devices causing and/or associated with the network issue. The CSP 312 may determine and/or request appropriate peering policy to apply to the identified client device(s) in furtherance of resolving the detected network issue.

As discussed above, the peering relationship between the NSP 311 and the CSP 312 may governed by a peering policy (e.g., peering policy service agreement, network policy, etc.) that indicates how each service provider is to peer content transmitted between their respective networks (e.g., networks 300, 315). As an example, the peering relationship or policy may indicate that either service provider (e.g., CSP 312 and NSP 311) can have the right to terminate the peering relationship at any time without gaining permission from the other service provider. The peering policy can also govern other such things as billing, bandwidth requirements, data routing preferences, and the like. Accordingly, during an application session, a request for content originating from a client device (e.g., device 301, 302) to a corresponding (or appropriate) application server (e.g., server 331) may be re-directable, as will be explained herein, to different elements (e.g., PTC 320, 321) within the content distribution network (e.g., network 315).

At step 360, the APM 325 of CSP 312 may send a policy request to the APM 305. In some aspects of the present disclosure, the policy request may include token information that uniquely identifies the application and/or subscriber to which the requested peering policy should be applied. For example, in some embodiments, the token information included in the peering policy request may identify a particular application token being utilized by CSP 312 to identify particular subscribers and/or applications to which the requested peering policy should be applied. As discussed above, CSP 312 may configure an application to insert into each data packet generated during an application session an application token configured to uniquely identify the application and/or subscriber participating in the application session. In some embodiments, CSP 312 may configure an application to periodically insert the application token into a plurality of data packets generated during an application session. The frequency in which an application inserts an application token into data packets may be configurable by a network administrator. In other embodiments, CSP 312 may configure an application to generate an identity hash based on the application token associated with the particular application and client device participating in the application session. The application may be configured to periodically insert the identify hash into a plurality of data packets generated during the application session.

In some aspects of the present disclosure, CSP 312 may execute additional security and encryption measures to protect the integrity of the application token (and/or information associated therewith) inserted into a data packet. In some embodiments, the CSP 312 may apply a filter (e.g., IP filter, hash filter/algorithm, etc.) or other suitable encryption protocol to protect the application token (and/or information associated therewith) inserted into a data packet. In one of these embodiments, the NSP 311 may specify the filter or other suitable encryption protocol to be utilized by the CSP 312 when encrypting application tokens inserted into data packets. As described above, the NSP 311 may transmit this security information to CSP 312 when establishing the peering relationship and/or communication connection as described above with respect to steps 353 and/or 357. Thus, as will be described in more detail below, the NSP 311 may execute the appropriate security measure and/or encryption protocol necessary to access an application token (and/or information associated therewith) within a data packet transmitted across network 300.

In other embodiments, APM 325 may transmit the peering policy request to APM 305 via a secure policy communication channel, such as secure policy channel 316 depicted in FIG. 3A. The peering policy request transmitted by APM 325 to APM 305 may be executed at the application layer. In other aspects of the present disclosure, the peering policy request sent by CSP 312 may also include the specified peering policy to be applied to data packets associated with a particular application token. For example, if the CSP 312 detects unusual data traffic originating from a subscriber or client device (e.g., device 301) utilizing an application provided by the content service provider, the APM 325 residing in network 315 may transmit a request to APM 305 that particular peering policy be applied to data packets containing an application token associated with the particular subscriber and/or application.

The APM 325 may include in the policy request token information identifying the application and/or subscriber(s) to which the peering policy should be applied. In other embodiments, APM 325 may include in the policy request other types of information identifying the application and/or subscriber(s) to which the peering policy should be applied, such as source IP address information, source port information, and the like. In still other embodiments, APM 325 may include in the policy request content distribution network information (and/or performance metrics), such as network latency, bandwidth, data packet rate, and the like. Various types of network information and performance metrics may be included in the policy request or in other data exchanged between the application peering managers without departing from the scope of the present disclosure. Referring now to the example depicted in FIG. 3B, the peering policy request transmitted during step 360 includes peering policy information configured to adjust the peering relationship between NSP 311 and CSP 312. In this example, the peering policy request includes a request to reroute data packets containing and/or associated with the token information contained therein from peer tunnel concentrator 320 to a different peer tunnel concentrator (e.g., PTC 321).

At step 361, APM 305 may transmit the peering policy request received during step 360 to a policy enforcement point or other network element in network 300, such as PEP 310. During step 361, PEP 310 may accept the peering policy request sent by APM 305. In some embodiments, the APM 305 may transmit to PEP 310 (or some other network element in network 300) instructions for applying the policy contained in the peering policy request received during step 420.

At step 363, the PEP 310 may apply the peering policy identified in the peering policy request received during step 361. In some aspects of the present disclosure, the PEP 310 may inspect and compare data packet information transmitted by subscribers (e.g., client devices) over network 300 with token information contained in the peering policy request. In some embodiments, PEP 310 may inspect a data packet to determine a user ID or other identifier for the subscriber transmitting the data packet. In other embodiments, PEP 310 may inspect a data packet to identify a hash associated with the incoming data packet. Additionally or alternatively, PEP 310 may inspect a data packet to determine an application ID or other identifier for the application being utilized by subscriber for which the data packet was transmitted. For example, PEP 310 may compare the user ID and/or application ID of an incoming data packet with user information and/or application information provided by the token information contained within a peering policy request to determine a match (e.g., whether the subscriber/application identified by token information in the policy request is the same subscriber/application associated with the application token within the incoming data packet). In some aspects of the present disclosure, if data packet information inspected by the PEP 310 corresponds to token information contained in the peering policy request, the PEP 310 may apply the peering policy identified in the peering policy request received during step 361 to the incoming data packet.

Referring back to the example depicted in FIGS. 3A and 3B, after receiving the peering policy request from APM 305, the PEP 310 may inspect data packets transmitted from subscribers 303 and 304 to determine whether to apply the peeing policy. During step 363, if the PEP 310 determines that an application token within a data packet originating from a subscriber and/or application in network 300 corresponds to token information contained in the peering policy request, then at step 365, the PEP 310 may apply the peering policy contained in the peering policy request to the incoming data packet. In other embodiments, if the PEP 310 determines that a data packet originating from a subscriber and/or application in network 300 does not correspond to information identified in the application token, then at step 365, the PEP 310 will apply the original (or standard) peering policy governing the relationship between NSP 311 and CSP 312 (e.g., the data packet may be routed to PTC 420). In other aspects of the present disclosure, during step 365, the PEP 310 may communicate the peering policy to APM 305, such that APM 305 may facilitate the application of the peering policy.

In other aspects of the present disclosure, an APM may also be configured implement data traffic balancing policy within a network. In some embodiments, rather than applying peering policy to a particular subscriber, the peering relationship between the service providers (e.g., NSP 311 and CSP 312) may be adjusted or modified such that a policy may be applied that would redirect data traffic sent over networks 300 and 315. In such arrangements, APM 325 may transmit a policy request to APM 305 (as described above with respect to step 360) that contains information identifying a specified data traffic balancing policy to be applied within networks 300 and 315.

In some embodiments, the APM 305 may reroute or redirect data packets from a first PEP exceeding a threshold level of load to a second PEP that is below the threshold level of load. Additionally or alternatively, the APM 305 may redirect data packets from a first PEP in a first geographic location to a second PEP in a second geographic location. The APM 305 may be further configured to switch (or adjust) the tunnel connection (e.g., tunnel 317) between the first PEP and a network element in network 315. The APM 305 may also be further configured to switch a portion of the data traffic sent across network 300 from the first PEP to a second PEP. Referring to the above examples, in order to redirect data packets to the second PEP, the APM 305 may tunnel across network 300 such that predetermined data traffic is rerouted to the second PEP. By rerouting data traffic to the second PEP that is below a threshold level of work load (and/or is not being adversely affected by a network attack or other issues), the first PEP will more easily be able to handle incoming data traffic or load. Additionally or alternatively, by redirecting data traffic to the second PEP, the first PEP may be more easily able to manage and/or accept peering policy configured to balance load and resources across the network and/or to address/prevent network attacks from being as effective.

In some aspects of the present disclosure, a network service provider may adjust peering policy and/or its peering relationship with a content service provider based on current and/or historic network performance. The network service provider may adjust and/or apply peering policy without receiving a policy request from a content service provider. For example, if a network service provider (e.g., NSP 311) detects that a PEP is experiencing increased data traffic, the NSP may apply (or adjust) peering policy via APM 305 such that packets intended for the first PEP are rerouted to a different PEP. In some embodiments, APM 305 may be configured to instruct one or more PEPs or other network elements to implement the peering policy.

For example, in the instance that PEP 310 and a second PEP have established a communication connection with a single PTC (e.g., PTC 320), the two PEPs may cause PTC 320 to exceed a predetermined threshold level of workload. In this example, APM 305 may apply a peering policy configured to instruct either PEP 310 or the second PEP to reroute data packets to a different PTC (e.g., PTC 321). In some aspects of the present disclosure, the CSP (e.g., CSP 312) may transmit the IP address of the different PTC (e.g., PTC 321) in the peering policy request received by APM 305. As another example, in the instance that PTC 320 has exceeded a threshold level of workload, the APM 305 may apply a peering policy configured to instruct PEP 310 to redirect certain data traffic intended for PTC 320 to a different PTC (e.g., PTC 321).

In other aspects of the present disclosure, APM 305 may transmit a notification and/or request to APM 325, via secure policy communication channel 316, identifying peering policy to be applied to current and/or future application session being handled by CSP 312. APM 325 may then apply peering policy within network 315 based on the request and other information received from APM 305. For example, the APM 325 may adjust and/or modify an application session by transmitting instructions to the underlying application to redirect data packets from an initial network element (e.g., PEP 310) to a different and/or specified network element. Additionally or alternatively, as discussed above, the CSP 312 may request the NSP 311 to implement such peering policy based on network information (and/or other information) sent from the NSP 311 during the peering relationship.

Having discussed a process flow of a method for application peering, discussion will now turn to a method of responding to connection and policy requests for a network service provider and applying peering policy data packets sent over a network, according to some aspects discussed herein and illustrated in FIG. 4.

FIG. 4 illustrates a method of responding to connection and policy requests for a network service provider and applying peering policy data packets sent over a network in accordance with one or more illustrative aspects discussed herein. In one or more embodiments, the method illustrated in FIG. 4 and/or one or more steps thereof may be performed by a computing device (e.g., generic computing device 200). Additionally or alternatively, the method illustrated in FIG. 4 and/or one or more steps thereof may, in some instances, be performed by a policy enforcement device (e.g., a policy enforcement point) configured to accept and apply peering policy to an application session. In some embodiments, the policy enforcement device may comprise a network element, such as a network router. In other embodiments, the method illustrated in FIG. 4 and/or one or more steps thereof may be embodied in computer-executable instructions that are stored in a computer-readable medium, such as a non-transitory computer-readable memory.

At step 405, the policy enforcement device may establish a communication connection with a peer tunnel concentrator (PTC). The PTC may be located within the network of a content service provider. The PTC may be operatively in communication with one or more application servers of the content service provider. In some embodiments, the PCT may comprise a peering router. In other embodiments, the policy enforcement device may establish a communication connection with a plurality of PTCs associated with a content provider.

In step 410, the policy enforcement device may monitor data transmitted over a network to determine whether an application session has been established. In some embodiments, an application session may be established when a subscriber begins utilizing an application provided by a content service provider. In other embodiments, a computing device residing in the network (e.g., network 300) may transmit a message to the policy enforcement device indicating that an application session has been established with a content service provider. For example, a client device may transmit a message (or notification) to the policy enforcement device after the client device initiates an application session with a content service provider. During step 410, if the policy enforcement device determines that an application session has not been established, the method may return to step 410 and the policy enforcement device may continue to monitor data transmitted over the network to determine whether an application session has been established with a content service provider. The policy enforcement device may be configured to monitor various types of computing devices without departing from the scope of the present disclosure, including devices capable of establishing a network communication connection, such as a desktop computer, a laptop computer, a thermostat, a set-top device, and the like If the policy enforcement device determines that an application session has been established with a content service provider, the method may proceed to step 415 where the policy enforcement device may wait to receive application data packets. The policy enforcement device may receive application data packets from one or more client devices participating in the application session established during step 410. During step 415, if the policy enforcement device does not receive an application data packet, the method may proceed back to step 415, where the policy enforcement device may continue to wait to receive a data packet.

If the policy enforcement device receives an application data packet during step 415, the method may proceed to step 420, where the policy enforcement device may determine whether an application policy request has been received. As discussed above, with respect to FIGS. 3A and 3B, a content service provider may send a peering policy request to network service provider when attempting to adjust the peering relationship between the two providers. For example, the content service provider may transmit a peering policy request to the network service provider in response to detecting unusual data traffic (e.g., a DDOS attack) associated with a subscriber in the network of the network service provider. Additionally or alternatively, the content service provider may transmit a peering policy request to the network service provider in response to detecting an excessive level of network resource consumption from one or more subscribers in the network of the network service provider. In some embodiments, the content service provider may include information (e.g., token information) in the peering policy request identifying the subscriber and/or application from which the unusual data traffic and/or network resource consumption originates.

During step 420, if the policy enforcement device determines that a peering policy request has not been received, the method may proceed to step 430, where the policy enforcement device may transmit the data packet received during step 415 to a computing device associated with the content service provider. In some embodiments, the data packet may be transmitted to one or more network elements (e.g., routers) prior to arriving at a computing device (e.g., application server) in the content service provider's network. In other embodiments, the policy enforcement device may transmit the data packet to a destination in accordance with current (or standard) peering policy. After the policy enforcement device has transmitted the data packet, the method may proceed to step 415, where the policy enforcement device may wait to receive a subsequent data packet(s).

Referring back to step 420, if the policy enforcement device determines that a peering policy request has been received, the method may proceed to step 435, the policy enforcement device may retrieve token information from the peering policy request received during step 420 to determine the subscriber and/or application to which the peering policy should be applied to. In some embodiments, the token information contained within the peering policy request may be protected or encrypted. In such embodiments, the policy enforcement device may execute a predetermined encryption protocol to access the token information. The policy enforcement device may store the token information in memory (or other storage) for subsequent retrieval. In some embodiments, during step 435, the policy enforcement device may inspect the data packet received during step 415 to determine the subscriber and/or application that transmitted the data packet.

At step 440, the policy enforcement device may determine whether information contained within the data packet received during step 415 corresponds with (or matches) the token information retrieved from the peering policy request during step 435. In some embodiments, the information contained within the data packet may include an application token as described herein. In some embodiments, the information contained within the data packet may be protected or encrypted by CSP 312. Various types of encryption methods or protocols may be utilized by CSP 312 to protect information within data packets generated during an application session without departing from the scope of the present disclosure, such as a hash filter/algorithm, an IP filter, and other suitable encryption protocols. In such arrangements, the policy enforcement device may execute the predetermined encryption protocol (or other security measure) to access the protected information within the data packet received during step 415. For example, the policy enforcement device may run a hash function on one or more portions of the information contained within the data packet in furtherance accessing protected information contained within the data packet received during step 415.

As noted above, the policy enforcement device may compare information in the data packet (e.g., an application token and/or other suitable information identifying the subscriber and/or application that transmitted the data packet) with token information retrieved from the peering policy request, which may uniquely identify the subscriber and/or application for which the peering policy should be applied. If the policy enforcement device determines that the information in the data packet does not correspond to the token information retrieved from the policy request during step 435, the method may proceed to step 430, where the policy enforcement device may transmit the data packet to its intended destination.

During step 440, if the policy enforcement device determines that the information in the data packet corresponds to (or matches) the token information retrieved from the policy request during step 435, the method may proceed to step 445, where the policy enforcement device may apply network peering policy to the data packet. As discussed above, the peering policy request received during step 420 may contain peering policy information that defines the peering relationship between two networks, such as the networks between the content service provider and the network service provider. During step 445, the policy enforcement device may extract data from the peering policy request indicating peering policy to be applied to the data packet received during step 415.

In some embodiments, the peering policy information may indicate that the policy enforcement device should send the data packet to a predetermined destination (and/or device). For example, the peering policy information may include an address (or identifier) of a particular peer tunnel concentrator to which the policy enforcement device should redirect the data packet. In other embodiments, the peering policy information may indicate that the policy enforcement device should drop data packets originating from a particular client device (e.g., the policy enforcement device should not transmit or redirect data packets originating from a particular client). In still other embodiments, during step 445, the policy enforcement device may transmit a notification to one or more computing devices indicating that peering policy will be applied to the data packet analyzed during step 440. In some of these embodiments, the notification may be sent to various other devices without departing from the scope of the present disclosure, such as a client device from which the data packet originated, a computing device (e.g., application server) to which the data packet was originally destined, etc.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. An apparatus comprising:
one or more processors; and
memory storing computer readable instructions that, when executed by the one or more processors, cause the apparatus to:
receive a peering policy request comprising:
one or more characteristics of a network disruption, and
data routing preferences for exchanging information between the apparatus and a computing device;
receive, from a client device, a first data packet addressed to the computing device, the first data packet comprising an application token identifying a first user and a first application;
based on a comparison of the application token and the one or more characteristics of the network disruption, causing a peering policy to be applied to the first data packet, via one or more network elements, for addressing the network disruption in accordance with the peering policy request; and
send, using the data routing preferences, the first data packet to the computing device.

2. The apparatus of claim 1, wherein the one or more characteristics of the network disruption comprise at least one of:
a user identifier (ID) indicating a user associated with the data routing preferences; or
an application ID indicating an application to which to apply the data routing preferences.

3. The apparatus of claim 2, wherein the instructions, when executed by the one or more processors, further cause the apparatus to apply the peering policy to the first data packet further based on determining that the first data packet may be sent to the computing device.

4. The apparatus of claim 2, wherein the instructions, when executed by the one or more processors, further cause the apparatus to apply the peering policy to the first data packet further based on determining that at least one of:
the application ID corresponds to the first application; or
the user ID corresponds to the first user.

5. The apparatus of claim 1, wherein the instructions, when executed by the one or more processors, further cause the apparatus to:
after determining that the one or more characteristics of the network disruption correspond to the application token, send an instruction to the computing device to apply the data routing preferences.

6. The apparatus of claim 1, wherein at least one of the one or more network elements are associated with a network involved in the network disruption.

7. A method, implemented by one or more first computing devices, comprising:
detecting a network disruption;
after detecting the network disruption, sending, to a second computing device, a peering policy request for requesting assistance to prevent future network disruption, the peering policy request comprising:
one or more characteristics of the network disruption; and
data routing preferences indicating how information should be exchanged between the second computing device and the one or more first computing devices; and
receiving, from the second computing device using the data routing preferences, a plurality of data packets comprising application tokens that do not comprise the one or more characteristics of the network disruption.

8. The method of claim 7, further comprising:
determining one or more client devices associated with the network disruption; and
sending, to the one or more client devices, a notification indicating one or more corrective measures to resolve the network disruption.

9. The method of claim 7, wherein the one or more first computing devices are associated with a content service provider and the second computing device is associated with a network service provider.

10. The method of claim 7, wherein the data routing preferences comprise a request to reroute, from a first network element to a second network element, one or more data packets comprising application tokens that comprise the one or more characteristics.

11. The method of claim 7, wherein the one or more characteristics of the network disruption comprise at least one of: a user identifier (ID); an application ID; an application session ID; or a device ID.

12. A method, implemented by one or more first computing devices, comprising:
receiving a peering policy request for requesting assistance to prevent future network disruption, the peering policy request comprising:
a characteristic of a network disruption; and
data routing preferences indicating a peering relationship between the one or more first computing devices and a second computing device; and
using the characteristic of the network disruption and the data routing preferences to determine where each of a plurality of data packets should be sent within one or more networks.

13. The method of claim 12, wherein using the characteristic and the data routing preferences to determine where each of the plurality of data packets should be sent comprises:
sending, to a first network element, one or more first data packets, of the plurality of data packets, that comprise the characteristic; and
sending, to a second network element, one or more second data packets, of the plurality of data packets, that do not comprise the characteristic.

14. The method of claim 13, wherein a load on the first network element does not satisfy a load threshold and a load on the second network element satisfies the load threshold.

15. The method of claim 13, wherein the first network element is located in a different geographic region than the second network element.

16. The method of claim 12, further comprising:
   detecting increased data traffic at a first network element; and
   adjusting, based on the increased data traffic, the data routing preferences to reroute one or more data packets, of the plurality of data packets, to a second network element.

17. The method of claim 12, wherein using the characteristic and the data routing preferences to determine where each of the plurality of data packets should be sent comprises:
   quarantining one or more data packets, of the plurality of data packets, that comprise the characteristic.

18. The apparatus of claim 1, wherein the apparatus is associated with a network of a first service provider and the peering policy request originates from a network of a second service provider.

19. The apparatus of claim 1, wherein the instructions, when executed by the one or more processors, further cause the apparatus to:
   perform, based on the peering policy request, a first corrective action for one or more data packets associated with the first application; and
   perform, based on the peering policy request, a second corrective action for one or more data packets associated with a second application.

20. The apparatus of claim 1, wherein the instructions, when executed by the one or more processors, further cause the apparatus to:
   based on the peering policy request, drop one or more data packets associated with the first application; and
   based on the peering policy request, reroute one or more data packets associated with a second application.

21. The method of claim 12, wherein using the characteristic and the data routing preferences to determine where each of the plurality of data packets should be sent comprises:
   sending, to a first network element, one or more first data packets, of the plurality of data packets, that are associated with a first application; and
   determining not to send, to the first network element, one or more second data packets, of the plurality of data packets, that are associated with a second application.

* * * * *